United States Patent [19]
Okamura et al.

[11] 3,984,737
[45] Oct. 5, 1976

[54] PROTECTIVE RELAYING SYSTEM

[75] Inventors: Masami Okamura, Musashino; Yoshihumi Oura, Yokohama; Yoshihiro Sano, Katsuta; Junichi Makino; Yoshiteru Miki, both of Hitachi, all of Japan

[73] Assignees: Hitachi, Ltd.; The Tokyo Electric Power Co., Inc., both of Japan

[22] Filed: Dec. 6, 1974

[21] Appl. No.: 530,286

[30] Foreign Application Priority Data
Dec. 7, 1973 Japan.............................. 48-136176

[52] U.S. Cl. ............................ 317/36 D; 317/27 R; 235/151.31
[51] Int. Cl.² ......................................... H02H 3/42
[58] Field of Search ....................... 317/36 D, 27 R; 235/151.21, 151.31; 324/51, 52

[56] References Cited
UNITED STATES PATENTS

| | | | |
|---|---|---|---|
| 3,596,785 | 3/1971 | Durbeck et al. ...................... | 317/27 |
| 3,599,044 | 8/1971 | Takemura et al..................... | 317/27 |
| 3,731,152 | 5/1973 | Rockefeller.......................... | 317/27 |
| 3,758,763 | 9/1973 | Nohara et al. .................. | 235/151.31 |
| 3,885,199 | 5/1975 | Nohara et al........................ | 317/27 |

Primary Examiner—J. D. Miller
Assistant Examiner—Patrick R. Salce
Attorney, Agent, or Firm—Craig & Antonelli

[57] ABSTRACT

Protection of an electric power system is attained under control of a digital computer. Voltage and current of the electric power system to be protected are subjected to sampling at a predetermined sampling frequency and are applied to the computer after being converted into digital signals. The computer computes the product of these two digital signal inputs. The signal thus obtained is added to a preceding signal representing the product of voltage and current taken at time before a predetermined period of time so that unnecessary frequency components included in these signals can be removed. Then, the level of the resultant signal (which is free from the unnecessary frequency components) is compared with the level of a reference signal. When the former is greater than the latter, there is a fault in the electric power system, and necessary protective measures are taken to protect the electric power system.

12 Claims, 13 Drawing Figures

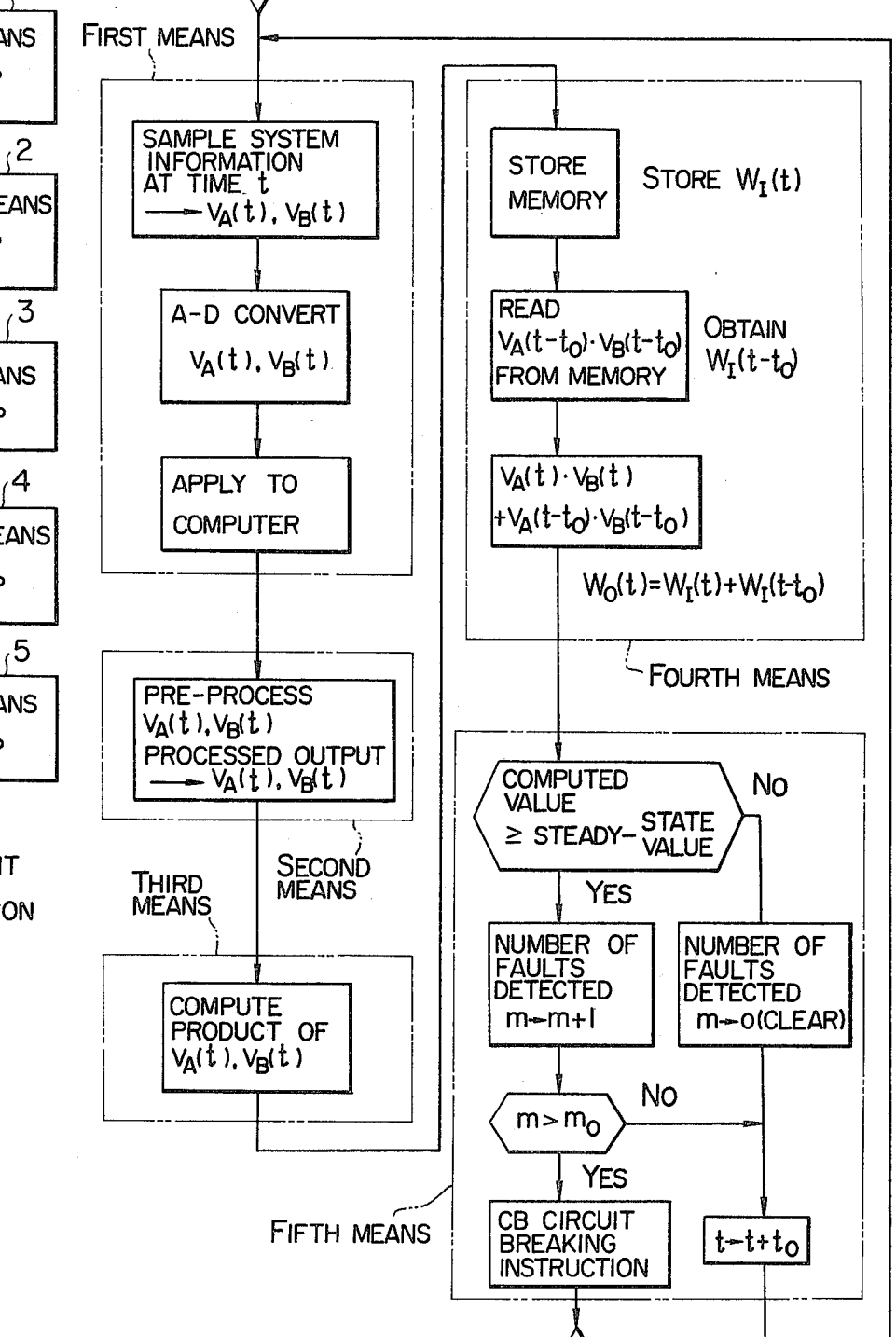

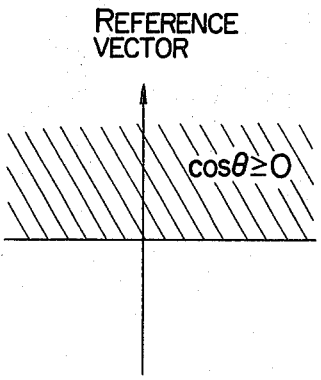
FIG. 8
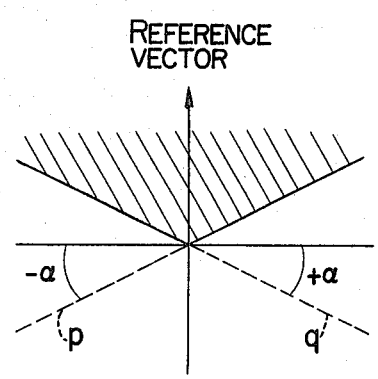
FIG. 9
REGION ABOVE p $\cos(\theta-\alpha) \geq 0$
REGION ABOVE q $\cos(\theta+\alpha) \geq 0$
FIG. 10
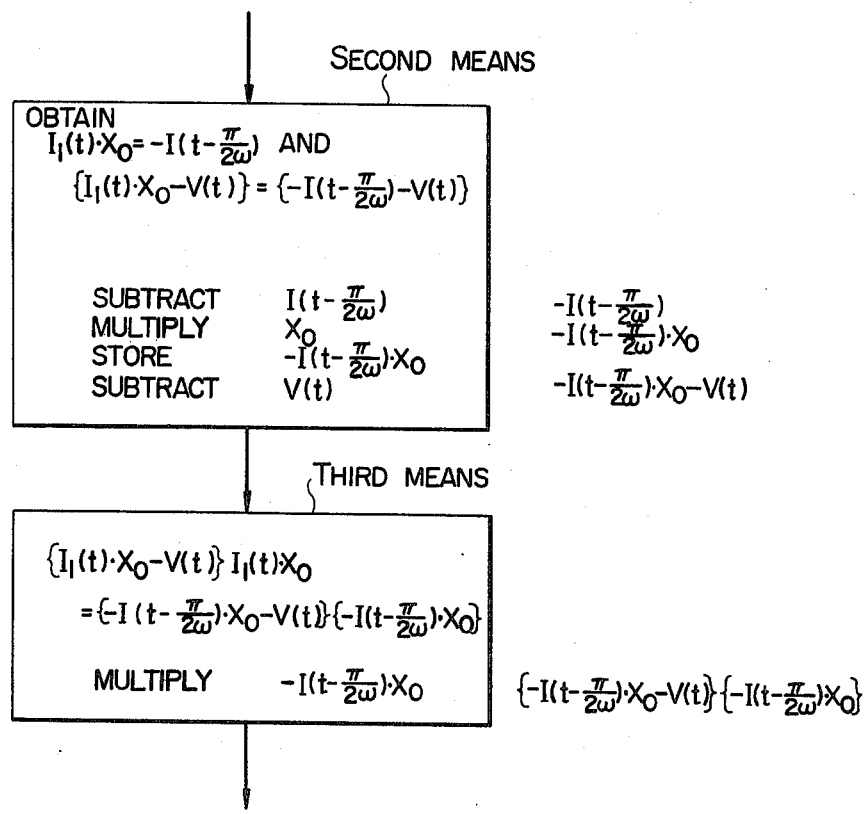

PROTECTIVE RELAYING SYSTEM

BACKGROUND OF THE INVENTION

This invention relates to a protective relaying system for an electric power system, and more particularly to a system of the kind above described which is provided with means suitable for application to various types of relays which detect faults by digital means and deliver circuit breaking instruction signals so that these relays can be controlled by a common technique of arithmetic operation of system variables.

Electric power systems are very huge in scale and include various voltage levels ranging from a relatively high voltage to an ultra superhigh voltage. Various types of relays are used to protect various kinds of equipment in electric power systems, such as transmission lines, power station bus bars and transformers. Further, there are relays such as voltage relays, frequency relays and phase relays which are designed to operate by detecting various physical quantities. Thus, a great variety of protecting means are required for the electric power systems. The physical quantities such as the voltage and current in an electric power system are analog quantities. Therefore, most of the conventional relays employed hitherto have been of the hardware type provided with function of detecting faults on the basis of such analog quantities.

It is a recent tendency to attain digital control of relays in an electric power system by a computer for the purposes of achieving (1) the so-called simplification of hardware and (2) the possibility of changing the relay type by changing software which could not be achieved with the prior art method. However, various arithmetic operations must be carried out by the computer for the purpose of fault detection, and it is necessary to find a special arithmetic operation technique in order to control all the relays of various kinds as above described. A relaying system controlled by a computer and based on an arithmetic operation technique applicable in common to various relays has not been disclosed up to the present in anyone of the countries of the world.

A publication, for example, U.S. Pat. No. 3,569,785 entitled "POWER SYSTEM PROTECTIVE RELAYING BY TIME-COORDINATED SAMPLING AND CALCULATION" proposes that a protective relaying system having various relay characteristics can be realized by the technique of digital calculation. According to this U.S. Patent, however, physical quantities such as voltage and current of an electric power system to be protected are subjected to sampling in synchronism with a timing signal produced on the basis of one of these physical quantities, and the sampled physical quantities are converted into digital signals which are applied to a computer. While this patent provides a relatively common mode of calculation and is a useful invention, it is devoid of desired versatility in that a reference timing signal is required for the attainment of various calculations.

SUMMARY OF THE INVENTION

It is a primary object of the present invention to provide a novel protective relaying system which is controlled by a computer and based on a common arithmetic operation technique applicable to almost all the conventional relaying systems which have hitherto resorted to the hardware so as thereby to attain a great reduction in the processes of design, manufacture and inspection in the markers, to attain a great reduction of the running and maintenance costs in the users and to achieve a remarkable progress in the protective relaying technique.

According to the present invention, physical quantities such as voltage and current of an electric power system are subjected to sampling at a predetermined sampling frequency and are converted into digital signals to be applied to a digital computer. Whether or not protective operation is required is decided on the basis of a time-ndependent component of a signal representing the product of these two physical quantities, in other words, on the basis of a d.c. component appearing when the product of these two physical quantities is obtained.

Two digital quantities $V_A(t)$ and $V_B(t)$ proportional to physical quantities such as voltage and current of an electric power system to be protected are generally given as a function of time $t$ as follows:

$$V_A(t) = V_A \sin \omega t$$
$$V_B(t) = V_B \sin (\omega t + \theta) \quad (1)$$

It is very convenient for the purpose of fault detection if the value of $V_A V_B \cos \theta$, which is dependent only on the level and phase of these two inputs and independent of time, can be obtained on the basis of these digital data obtained by sampling the physical quantities at time $t$. This is apparent from the experience with the conventional relays in which this $V_A V_B \cos\theta$ was obtained on the basis of analog quantities.

More precisely, fault detection by a protective relay having a single input, such as an overcurrent relay or undervoltage relay, can be attained on the basis of $V_A^2$ detected thereby. The function of a protective relay having two inputs, such as a direction relay or distance relay, can be easily obtained by utilizing the term $V_A V_B$. Similarly, the function of an absolute value comprising relay can be obtained by utilizing the same term $V_A V_B$. The function of a phase comparing relay can also be obtained by utilizing the term $\cos\theta$. The function of a frequency relay can be obtained when $\theta$ is selected to be a function of the system frequency $f$. Further, this manner of thinking can be easily applied to a differential current relay.

The product of these two data obtained by sampling at an arbitrarily selected time $t_1$ is given by $$V_A(t_1) \cdot V_B(t_1) = (V_A V_B/2) \left\{ \cos\theta - \cos(2\omega t_1 + \theta) \right\} \quad (2)$$

This product includes an undesired second harmonic component as shown in the second term in the right-hand member of the equation (2) besides the first term which is proportional to $V_A V_B \cos\theta$. On the other hand, the product of these two data obtained by sampling at another time, for example, at time $t = t_1 + (\pi/2\omega)$ is given by $$V_A(t_1 + \frac{\pi}{2\omega}) \cdot V_B(t_1 + \frac{\pi}{2\omega})$$
$$= \frac{V_A V_B}{2} \left\{ \cos\theta + \cos(2\omega t_1 + \theta) \right\} \quad (3)$$

Thus, when the equation (3) is added to the equation (2), the undesired second harmonic components included in these equations cancel each other and the desired $V_A V_B \cos\theta$ can be solely obtained. The present invention is based on a manner of arithmetic operation as above described. According to the present invention, the above manner of arithmetic operation on the data is combined with the technique of digital filtering so as to provide a unique computer-controlled relay means which can operate with a characteric similar to that of various conventional relays.

BRIEF DESCRIPTION OF THE DRAWING

FIG. 1 shows a sequence of first to fifth means of steps employed in the system according to the present invention for carrying out the desired operation.

FIG. 2 is a flow chart in a typical embodiment of the present invention.

FIG. 8 shows a basic operating characteristic of a phase comparing relay.

FIG. 9 shows a modified operating characteristic of the phase comparing relay.

FIG. 10 shows a practical form of successive steps in the second and third means when the present invention is applied to the reactance relay having the operating characteristic shown in FIG. 5.

DESCRIPTION OF THE PREFERRED EMBODIMENTS

Figure 3:
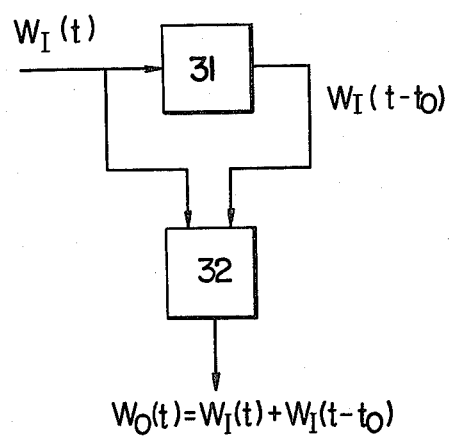
FIG. 3 is a block diagram showing the structure of a summing filter preferably used in the present invention.

The present invention is featured by the fact that first to fifth means described in detail later are provided in and around a digital computer for carrying out a series of arithmetic operations suitable for detecting faults in an electric power system so as to provide a technique which can be applied in common to nearly all the conventional relaying systems which have been designed to operate in an analog fashion.

FIG. 1 shows the flow of sequential operations of first to fifth means or steps employed in a typical embodiment of the system according to the present invention. The functions described below of these means or steps are merely illustrative of one form of the present invention for purposes of brevity of explanation. The functions of the first to fifth means or steps will be described in brief.

The function of the first means or step is to sample information and apply data thus obtained to a digital computer. The sampling frequency $fs$ is selected to be four times the fundamental frequency $f$ of physical quantities such as voltage and current of an electric power system to be protected. Two different primary information $v_A$ and $v_B$ are derived from the electric power system as original data and sampled to provide data $V_A$ and $V_B$ for detecting occurrence of fault in the electric power system.

The function of the second means or step is to carry out pre-processing of the data applied from the first means or step. Description will initially be given with reference to the case in which any especial pre-processing of the data is not carried out, and a preferred manner of pre-processing will be described later.

The function of the third means or step is to carry out an arithmetic operation to obtain the product of the data outputs $V_A$ and $V_B$ (corresponding to $V_A$ and $V_B$) of the second means.

The function of the fourth means or step is to filter the input applied thereto. In this means or step, a filter such as a digital summing filter is employed to derive solely $V_A V_B \cos\theta$ ($\theta$ representing the phase difference between $V_A$ and $V_B$) which is effective in detecting occurrence of fault.

The function of the fifth means or step is to decide whether or not protection is required. The fifth means decides that a fault is present in the electric power system when the output $V_A V_B \cos\theta$ of the fourth means or step is greater than a predetermined steady-state value.

FIG. 2 is a flow chart showing the functions of the first to fifth means or steps employed in an embodiment of the protective relaying system of the present invention applied for protecting an electric power system.

It will be apparent from the flow chart shown in FIG. 2 that the operation of the protective relaying system according to the present invention comprises sampling physical quantities $v_A$ and $v_B$ of an electric power system at predetermined time intervals (the data thus obtained as a result of sampling being called $V_A$ and $V_B$ herein), applying these data to an analog-digital converter to convert the same into digital quantities, and applying the A-D converted data to a digital computer. In the digital computer, these sampled data inputs are subjected to pre-processing such as vector composition. The product of these pre-processed data $V_A$ and $V_B$ is then obtained and subjected to digital filtering so that whether or not a fault is present in the electric power system can be decided on the basis of the filter output $V_A V_B \cos\theta$.

The data flow through the respective means or steps will be clearly seen from FIG. 2, and these means or steps have a 1:1 correspondence with the respective means or steps shown in FIG. 1. Hereinafter, the term "means" will be exclusively used for the sake of brevity.

Suppose now that two different information $v_A$ and $v_B$ used for detecting occurrence of fault in an electric power system to be protected are given by $$\left.\begin{array}{l} v_A(t) = v_A \sin\omega t \\ v_B(t) = v_B \sin(\omega t + \theta) \end{array}\right\} \quad (4)$$

where $\omega = 2\pi f$, and $f$ is the fundamental frequency of the electric power system.

The first means in FIG. 2 is constructed for subjecting these two data to periodic sampling at a sampling frequency $fs$ which is selected to be four times the fundamental frequency $f$ of the electric power system, converting the sampled data by an analog-digital converter into digital quantities $V_A(t)$ and $V_B(t)$ proportional to the instantaneous values being sampled, and applying these A-D converted data to a digital computer.

A sampling time $t_n$ relative to a reference time $t$ is expressed as $$t_n = t + (\pi/2\omega) \cdot n \qquad (5)$$

since the sampling is carried out at intervals of $\pi/2$ radians when the period of the fundamental frequency $f$ of the electric power system is $2\pi$ radians. In the equation (5), $n$ is a positive or negative integer, and $t_n = t$ when $n = 0$. Therefore, $V_A(t_n)$ and $V_B(t_n)$ can be expressed as follows:

$$\left. \begin{array}{l} V_A(t_n) = V_A \sin(\omega t + \frac{\pi}{2} n) \\ V_B(t_n) = V_B \sin(\omega t + \frac{\pi}{2} + \theta) \end{array} \right\} \qquad (6)$$

The box representing the second means in FIG. 2 is the step of pre-processing as described previously. In the embodiment presently described, it is supposed that any especial pre-processing is not carried out as described previously. However, in connection with later description which refers to such pre-processing, outputs corresponding to the inputs $V_A(t_n)$ and $V_B(t_n)$ to this box will be called $V_A(t_n)$ and $V_B(t_n)$ respectively. It is needless to say that the outputs of this second means in the embodiment presently described are expressed in a form similar to that in the equation (6).

The box representing the third means in FIG. 2 is constructed so that it functions to obtain the product of $V_A(t_n)$ and $V_B(t_n)$. Therefore, the result of the arithmetic operation in this third means on the data obtained at, for example, time $t_n = t$ is as follows:

$$V_A(t) \cdot V_B(t) = \frac{V_A V_B}{2} \{\cos\theta - \cos(2\omega t + \theta)\} \qquad (7)$$

This value is stored in the corresponding address of a memory in the fourth means.

It will be seen from the equation (7) that the result of the arithmetic operation includes an undesired component. That is, a second harmonic component having a frequency which is two times the fundamental frequency is included in the second term of the right-hand member of the equation (7) The fourth means in the embodiment of the present invention is provided with a digital summing filter so that this undesired component can be removed and the desired component $V_A V_B \cos\theta$ can solely be obtained.

This summing filter has a structure as shown in FIG. 3. Referring to FIG. 3, the summing filter is composed of a memory unit 31 and an adder unit 32. The operation of the filter will be briefly described. At time $t$, an input data $W_I(t)$ is applied to the filter to be stored in the corresponding address of the memory unit 31, and at the same time, to be applied as one input to the adder unit 32. A data $W_I(t - t_o)$ applied to and stored in the memory unit 31 at time $(t - t_o)$ is delivered from the memory unit 31 to be applied as the other input to the adder unit 32. These two inputs are added to each other and an output $W_o(t)$ appears from the adder unit 32. This output $W_o(t)$ is given by $$W_o(t) = W_I(t) + W_I(t - t_o) \qquad (8)$$

Suppose that $W_o(s)$ and $W_I(s)$ are the Laplace transformation of $W_o(t)$ and $W_I(t)$ respectively. Then, the equation (8) can be expressed as $$W_o(s) = W_I(s) + e^{-t_o s} W_I(s) \qquad (9)$$

It will be seen therefore that the transfer function of this summing filter is given by the following equation:

$$\frac{W_o(s)}{W_I(s)} = 1 + e^{-t_o s} \qquad (10)$$

In the equation (10), $s$ is replaced by $s = j\omega$ to assist in the understanding of the operating characteristic of the summing filter. Then, the gain $$\left| \frac{W_o(j\omega)}{W_I(j\omega)} \right|$$

in the operating frequency range of the summing filter is given by $$\left| \frac{W_o(j\omega)}{W_I(j\omega)} \right| = \left| 1 + e^{-j\omega t_o} \right| = \left| 2 \cos \frac{\omega t_o}{2} \right| \qquad (11)$$

Figure 4:
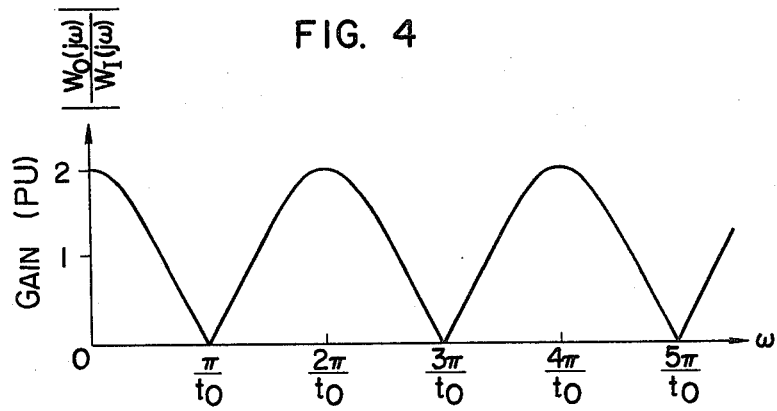
FIG. 4 is a graph showing the gain-frequency characteristic of the summing filter shown in FIG. 3.

FIG. 4 shows the gain-frequency characteristic of the summing filter based on the equation (11) It will be seen from FIG. 4 that the time interval $t_o$ between the data to be added to each other in the summing filter is preferably selected to satisfy the relation $$\omega = \frac{1}{2} (\pi/t_o) \qquad (12)$$

in order to eliminate the undesired component appearing as the result of the arithmetic operation to seek the product $V_A(t) \cdot V_B(t)$, that is, the second harmonic component having the frequency two times the fundamental frequency of the electric power system as pointed out in the description relating to the equation (7).

In the fourth means in FIG. 2, the product $$V_A(t - \frac{\pi}{2\omega}) \cdot V_B(t - \frac{\pi}{2\omega})$$

obtained at time $(t - t_o)$ $(t_o = \pi/2\omega)$ is derived from the memory to be added to the product $V_A(t) \cdot V_B(t)$ obtained at time $t$. It will be understood from the above description that the fourth means is provided with such a function so as to execute digital filtering by the summing filter.

Actual calculation of the product $V_A(t - (\pi/2\omega)) \cdot V_B(t - (\pi/2\omega))$ gives the following equation:

$$V_A(t - \frac{\pi}{2\omega}) \cdot V_B(t - \frac{\pi}{2\omega}) = \frac{V_A V_B}{2} \{\cos\theta + \cos(2\omega t + \theta)\} \qquad (13)$$

The function of the summing filter is to carry out the addition of the equations (13) and (7). The addition of these two equations gives the following value:

$$V_A(t) \cdot V_B(t) + V_A(t - \frac{\pi}{2\omega}) \cdot V_B(t - \frac{\pi}{2\omega})$$
$$= V_A \cdot V_B \cos\theta \qquad (14)$$

It will thus be apparent that the result shown in the equation (14) is representative of the d.c. component only and conforms without contradiction with the description given with reference to FIG. 4 showing the gain-frequency characteristic of the summing filter.

It is obvious from the above description that the output of the fourth means in FIG. 2, hence the input to the fifth means which decides the presence or absence of fault is $V_A(t) \cdot V_B(t) \cos\theta$ which is the product of the two digital quantities $V_A(t)$ and $V_B(t)$ corresponding to the two different information $v_A(t)$ and $v_B(t)$ of the electric power system to be protected by the relaying system of the present invention and the cosine of the phase difference $\theta$ between these two digital quantities $V_A(t)$ and $V_B(t)$.

It will be easily understood that, by obtaining the desired component $V_A(t) \cdot V_B(t) \cos\theta$, a computer controlled relay means can be realized which is provided with the features of conventional analog relays in addition to its unique features and which is applicable to almost all the kinds of relaying systems for digital processing of data. Practical examples of fault detection will be described later. Before giving such description, the consumption of the fifth means will be described with reference to the case in which this $V_A(t) \cdot V_B(t) \cos\theta$ is compared with a predetermined steady-state value (reference value) K so as to sequentially detect the presence or absence of fault each time such product is obtained. The first step in the fifth means in FIG. 2 is constructed to possess this function.

It is assumed herein that the fifth means decides that a fault is present in the electric power system to be protected when the relation between the output $V_A(t) \cdot V_B(t) \cos\theta$ of the fourth means and the reference value K is as follows:

$$V_A(t) \cdot V_B(t) \cos\theta > K \qquad (15)$$

In the fifth means attaining this function, whether or not the relation shown in the inequality (15) holds is judged at first. When the judgment proves that the relation shown in the inequality (15) holds, "1" is added to a counter which counts the number of times the inequality (15) holds. That is, this counter counts the cumulative number of times $m$ of continuous detection of fault during successive judgment of the above relation. When the number $m$ of continuous fault detection attains a predetermined number $m_0$ requiring the operation of a specific relay, an associated circuit breaker CB(not shown) is instructed to break the circuit. On the other hand, when this number $m$ is less than the predetermined number $m_0$, no circuit breaking instruction signal is generated and the first step is started again. The data sampling by the first means is started from the next sampling time, and the steps entirely the same as those described are repeated again. Further, when the judgment in the fifth means proves that the relation shown in the inequality (15) does not hold, the counter counting the cumulative number of continuous fault detection is cleared before the operation of the first means is started again.

In the basic embodiment of the present invention described hereinbefore, the second means in FIG. 2, that is, the means for carrying out pre-processing such as vector compostion may be constructed to be suitable for specific relay means. Some practical forms of the second means will be described later.

Further, the fourth means or digital filtering means is in no way limited to the illustrated form and may have any suitable other construction provided that the undesired frequency component which varies depending on the application can be filtered by such construction to an extent which does not provide any practical problem. Practical forms of this fourth means are described in detail in, for example, Japanese Pat. application No. 53574/1973 entitled "DIGITAL FILTER", Japanese Pat. application No. 53585/1973 entitled "DIGITAL FILTER", and Japanese Pat. application No. 53579/1973 entitled "DIGITAL FILTER", and it is unnecessary to provide any further detailed description of this means.

The fifth means which decides the presence of trouble may also be constructed to be suitable for specific relay means. Some practical forms of this fifth means will also be described later.

In the above-mentioned embodiment of the present invention, the sampling frequency $fs$ is selected to be $fs = 4f$ so that data $V_A(t)$ and $V_B(t)$ can be sampled at the time interval of $t_o = (\pi/2\omega)$ given by the equation (12) and added to each other by the summing filter. However, this is generally not necessarily an essential requirement. In the case in which the presence of fault is judged on the basis of a plurality of results of fault detecting operations carried out at a plurality of different times, the sampling frequency is desirably selected to be a suitable value satisfying the relation $fs > 2f$ according to the rule of sampling. Further, the sampling frequency may have any suitable value when a relay is adapted to operate in response to the result of fault detection based on only one sampled data. In any case, it is advisable to determine the sampling frequency according to the system requirements including the precision of specific protective relays and the timing with which sampled data are applied to the digital filtering means.

Further, it is needless to say that the capacity of the memory in the fourth means for storing the output of the third means should be determined to suit the type of the digital filter used in the fourth means.

Practical application of the present invention to various types of relays will now be described. At first, practical application of the present invention to a reactance relay will be described.

Figure 5:
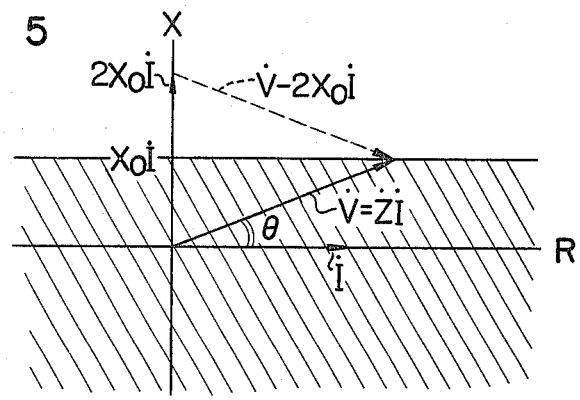
FIG. 5 shows a typical operating characteristic of a reactance relay.

FIG. 5 shows a typical operating characteristic of a known reactance relay. In FIG. 5, the hatched portion represents the operating region of the reactance relay, $X_o$ is the reactance value in the steady state, and V and I are the vector representation of instantaneous values $V(t)$ and $I(t)$ of voltage and current respectively derived from an electric power system to be protected and applied to the digital computer by the first means shown in FIG. 1. Therefore, there holds the relation $V = ZI$ where Z is the impedance in the protective range of the relay.

In FIG. 5, the following inequality is utilized so that the reactance relay can be actuated on the basis of the product obtained by the third means in FIG. 1:

$$\{I_1(t)X_o - V(t)\} \cdot I_1(t)X_o \geq 0 \qquad (17)$$

The current value $I_1(t)$ in the inequality (17) is obtained by advancing the phase of the current value $I(t)$ sampled at time $t$ by $\pi/2$ radians, hence $I_1(t) = -I(t - \pi/2\omega)$. Therefore, the polarity of the data sampled at time $(t - \pi/2\omega)$ may be inverted to provide the current value $I_1(t)$.

Thus, the second means in FIG. 1 is constructed to produce $I_1(t)X_o$ and $\{I_1(t)X_o - V(t)\}$ by arithmetic operation on the basis of the computer inputs $V(t)$ and $I(t)$ and steady-state reactance value $X_o$ an to apply these values to the third means. Practical steps in the second means are shown in FIG. 10.

The third means is constructed to obtain the product of the outputs $I_1(t)X_o$ and $\{I_1(t)X_o - V(t)\}$ of the second means and to apply the resultant value to the fourth means. Practical steps in the third means are shown in FIG. 10.

The fourth means is constructed to store temporarily the output of the third means and to read out from the memory the product $\{I_1(t-\pi/2\omega) X_o - V(t-\pi/2\omega)\} \cdot I_1(t-\pi/2\omega) X_o$ obtained at time $(t - \pi/2\omega)$ so that the product obtained at time t and the product obtained at time $(t - \pi/2\omega)$ can be added to each other. The result of this addition is $$\{I_1(t)X_o - V(t)\} \cdot I_1(t)X_o + \{I_1(t - \frac{\pi}{2\omega})X_o - V(t - \frac{\pi}{2\omega})\} \cdot I_1(t - \frac{\pi}{2\omega}) X_o$$
$$= I_M{}^2 X_o{}^2 - I_M{}^2 Z X_o \sin\theta \qquad (18)$$

where $I_M$ is the maximum value of $I(t)$, and $$Z = \frac{V(t)}{I(t)}.$$

The right-hand member of the equation (18) appears as the output of the fourth means.

Therefore, the fifth means may be constructed to decide that fault is present in the electric power system when the following relation holds:

$$I_M{}^2 X_o{}^2 - I_M{}^2 Z X_o \sin\theta \geq 0 \qquad (19)$$

It is thus apparent that a reactance relay having the phase characteristic given by $$Z \leq X_o/\sin\theta \qquad (20)$$

can be obtained.

It is also apparent that another reactance relay can be realized when the impedance $Z_o$ is substituted for the steady-state reactance value $X_o$ in the equation (18). For example, an ohm relay can be obtained when $Z_o = R_o$. Needless to say, the right-hand member of the inequality (17) may be a finite value $V_D$ in lieu of zero.

Practical application of the present invention to a mho relay will next be described.

Figure 6:
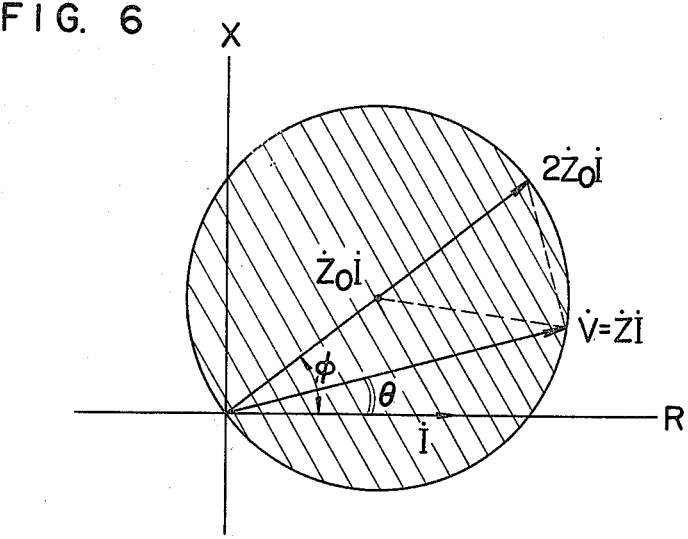
FIG. 6 shows a typical operating characteristic of a mho relay.

FIG. 6 shows a typical operating characteristic of a known mho relay. In FIG. 6, the hatched portion represents the operating region of the mho relay, $Z_o$ is the impedance value in the steady state, the V and I are the vector representation of instantaneous values $V(t)$ and $I(t)$ of voltage and current respectively derived from an electric power system to be protected and applied to the digital computer by the first means shown in FIG. 1. Further, there holds the relation $Z = V/I$.

In FIG. 6, the following relation is utilized so that the mho relay can be actuated on the basis of the product obtained by the third means:

$$\{2Z_o I_1(t) - V(t)\} \cdot V(t) \geq 0 \qquad (21)$$

The current value $I_1(t)$ in the inequality (21) is obtained by advancing the phase of the current value $I(t)$ sampled at time $t$ by $\pi/2$ radians, hence $I_1(t) = - I(t - \pi/2\omega)$. Therefore, the polarity of the data sampled at time $(t - \pi/2\omega)$ may be inverted to provide the current value $I_1(t)$.

The second means or pre-processing means in FIG. 1 may be constructed to produce $2Z_o I_1(t)$ and $\{2Z_o I_1(t) - V(t)\}$ on the basis of the computer inputs $V(t)$ and $I(t)$ and steady-state impedance value $Z_o$ by arithmetic operation similar to that carried out for the reactance relay and to deliver these values as its outputs.

The third means is constructed to obtain the product of the output $\{2Z_o I_1(t) - V(t)\}$ of the second means and $V(t)$ and to deliver the resultant value as its output.

The fourth means is constructed to store temporarily the output of the third means and to read out from the memory the product $\{2Z_o I_1(t - \pi/2\omega) - V(t - \pi/2\omega)\} \cdot V(t - \pi/2\omega)$ obtained at time $(t - \pi/2\omega)$ so that the product obtained at time $t$ and the product obtained at time $(t - \pi/2\omega)$ can be added to each other.

The result of this addition is $\{2Z_o I_1(t) - V(t)\} \cdot V(t) + \{2Z_o I_1(t - \pi/2\omega) - V(t - \pi/2\omega)\} \cdot V(t - \pi/2\omega) = 2I_M{}^2 Z \cdot Z_o \cos(\phi - \theta) - I_M{}^2 Z^2 \qquad (22)$ where $I_M$ is the maximum value of $I(t)$, $Z = V(t)/I(t)$, and $\phi$ is the steady-state angle of $Z_o$. The right-hand member of the equation (22) appears as the output of the fourth means.

Therefore, the fifth means may be constructed to decide that fault is present in the electric power system when the following relation holds:

$$2I_M{}^2 Z \cdot Z_o \cos(\phi - \theta) - I_M{}^2 Z^2 < 0 \qquad (23)$$

It is thus apparent that a mho relay having the phase characteristic given by $$Z < 2Z_o \cos(\phi - \theta) \qquad (24)$$

can be obtained.

It is needless to say that a so-called offset mho relay can be obtained when $Z_o$ in the first term and $Z_o$ in the second term of the left-hand member of the equation (22) are selected to be different from each other. Further, the right-hand member of the inequality (23) may be a finite value $V_D$ in lieu of zero.

Application of the present invention to a differential current relay will next be described. It is supposed that the number of terminals is two for the sake of brevity.

Figure 7:
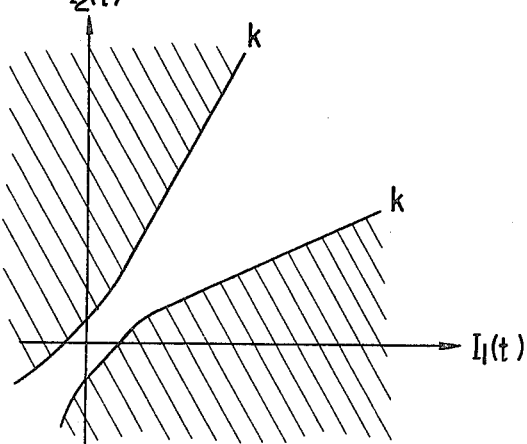
FIG. 7 shows a typical operating characteristic of a differential current relay.

FIG. 7 shows a typical operating characteristic of a known differential current relay. In FIG. 7, $I_1(t)$ and $I_2(t)$ represent instantaneous values of current flowing through the respective terminals of an electric power system to be protected and applied to the digital computer by the first means, and $k$ is the suppression factor.

The following relation is utilized in the differential current relay to detect the presence of fault in the electric power system:

$$|I_1(t) + I_2(t)|^2 - k|\{I_1(t)\}^2 + \{I_2(t)\}^2| \geq K \qquad (25)$$

Figure 11:
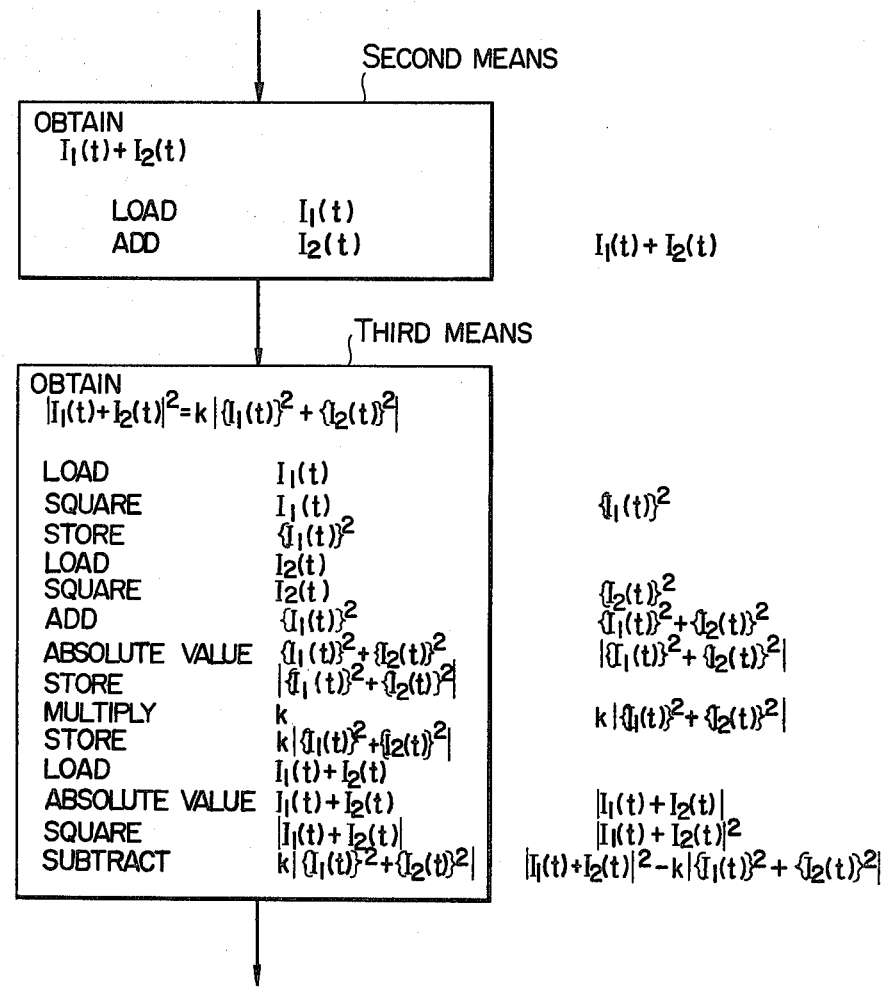
FIG. 11 shows a practical form of successive steps in the second and third means when the present invention is applied to the differential current relay having the operating characteristic shown in FIG. 7.

The first and second terms in the left-hand member of this inequality (25) may be considered to be a modification of the corresponding terms of the equation (14) referred to in the basic embodiment of the present invention. It will be easily understood that the first to fourth means can be suitably constructed so as to obtain the individual terms of the inequality (25) and any especial description as to the manner of constructing these means is unnecessary. FIG. 11 is a flow chart showing practical steps in the second and third means only.

Therefore, the fifth means may be constructed to decide the presence of fault in the electric power system on the basis of the inequality (25). It is thus apparent that the present invention is applicable also to a differential current relay.

It is needless to say that a differential current relay having any desired operating characteristic can be obtained by suitably selecting the suppression factor. Further, although the number of terminals is limited to two in the above description, it is readily understood that the present invention is applicable to a differential current relay dealing with a greater number of terminals.

The equation (14) teaches the fact that $\{I(t)\}^2$ which is proportional to current $i(t)$ of an electric power system can be obtained. It is therefore apparent that the present invention is applicable also to an overcurrent relay. Further, it will be understood that the present invention is similarly applicable to an undervoltage relay by suitably utilizing the equation (14).

Application of the present invention to a phase comparing relay will next be described. Most of conventional phase comparing relays are of the type in which the phase of one analog quantity is compared directly with the phase of another analog quantity. According to the present invention, the phase of one waveform is compared with that of another waveform by obtaining the product of these waveforms. More precisely, $V_A(t) \cdot V_B(t) \cos\theta$ can be obtained as a result of processing of two waveforms $V_A(t)$ and $V_B(t)$ by the second, third and fourth means in the manner shown in the equation (14) described with reference to the basic embodiment of the present invention. It can thus be easily understood that an operating characteristic as shown in FIG. 8 can be obtained by constructing the fifth means in such a manner that it can discriminate whether $\cos\theta$ is positive or negative.

To this end, $V_B(t)$ may be converted in the second means into $V_B(t) = V_B \sin(\omega t + \theta - \alpha)$ where $\alpha$ is the characteristic angle, and the fifth means may be constructed to discriminate the region in which $\cos(\theta + \alpha) \geq 0$ (the region above the line q in FIG. 9) and the region in which $\cos(\theta - \alpha) \geq 0$ (the region above the line p in FIG. 9). It will be apparent that a phase comparing relay having an operating characteristic as shown in FIG. 9 can be obtained when an AND logic of these results of discrimination is considered. It is needless to say that a phase comparing relay having any desired operating characteristic can be obtained since $\alpha$ can be set at any desired suitable value. Of course, in lieu of the function of the fifth means above described, an OR logic of the condition $\cos(\theta + \alpha) \geq 0$ or the condition $\cos(\theta - \alpha) \geq 0$ may be used in a phase comparing relay having different properties.

Figure 12:
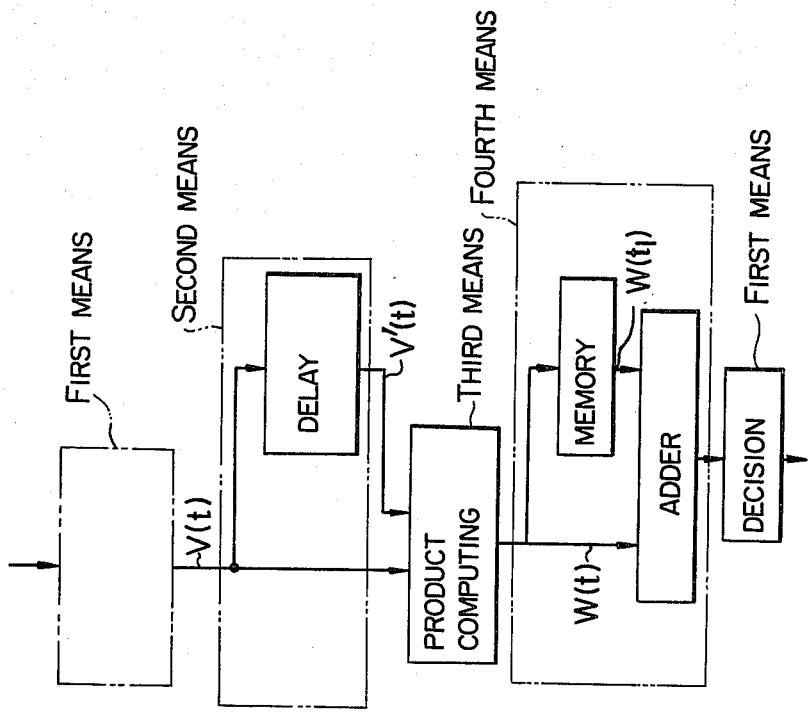
FIG. 12 is a block diagram corresponding to FIG. 2 when the present invention is applied to a frequency relay.

Application of the present invention to a frequency relay will next be described. For the purpose of a frequency relay, it is only necessary to consider an input of single kind, for example, a voltage input $V(t)$. This voltage input $V(t)$ is expressed as $V(t) = Vm \sin\omega t$ where $\omega = 2\pi f$. This input $V(t)$ is suitably delayed in order to obtain a signal which is proportional to the component including the input voltage frequency $f$, and the product of this signal and the input is obtained for detecting the frequency. An integrating filter means is used as the means for delaying the input. A flow chart for this kind of processing is shown in FIG. 12 in which means bearing like numerals perform like functions of the means shown in FIG. 2. The present embodiment is featured by the fact that an integrating filter means is incorporated in the second means for carrying out pre-processing of data so as to derive the frequency component as above described. In this embodiment too, the input data $V(t)$ is sampled at a sampling frequency which is four times the fundamental frequency of the voltage of an electric power system to be protected.

The integrating filter means integrates the input data $V(t)$ from time $(t - t_o)$ to time $t$. The output data $V'(t)$ appearing at the output of the integrating filter means is give by $$V'(t) = \int_{t-t_o}^{t} V(t)dt \tag{26}$$

Laplace transformation of the equation (26) gives $$LV'(t) = V'(s) = \frac{1}{s}(1 - e^{-t_o s})V(s) \tag{27}$$

Therefore, the transfer function is $$G(s) = \frac{V'(s)}{V(s)} = \frac{1}{s}(1 - e^{-t_o s}) \tag{28}$$

When $s = j\omega$ is substituted for $s$ and the gain of the integrating filter means in the operating frequency range is sought, this gain is expressed as $$G(j\omega) = \left| \frac{2}{\omega} \sin \frac{\omega t_o}{2} \right| \tag{29}$$

The change of the phase angle is given by $$\theta = -(\omega t_o)/2 \text{ radians} \tag{30}$$

and one phase leads the other phase when this $\theta$ is positive. It will thus be seen that the output $V'(t)$ of the integrating filter means has an amplitude greater than the input $V(t)$ by the value of the equation (29) and is shifted in phase from the input $V(t)$ by the value of the equation (30). The third means computes the product of $V(t)$ and $V'(t)$ and provides an output $W(t)$ given by $$W(t) = V(t) \cdot V'(t) = V_m \sin\omega t \cdot V'_m \sin(\omega t + \theta) = V_m \cdot V'_m \cdot \frac{1}{2} \{\cos\theta - \cos(2\omega t + \theta)\} \tag{31}$$

where $V'_m$ is the peak value of the output of the integrating filter means and is greater than $V_m$ by the value of the equation (29).

When $\theta$ is selected to be $|\theta| = \pi/2$ at the fundamental frequency $f$ of the electric power system and the first term of the equation (31) is considered to represent the output of the third means, it will be apparent that any change in the frequency can be detected on the basis of the equation (31). In other words, $W(t) = \frac{1}{2} V_m \cdot V'_m \cos\theta$ changes in a positive or negative direction when $\theta$ in the equation (30) changes due to a frequency change, although this $W(t)$ is always zero when there is no change in the frequency. Thus, the frequency change can be detected on the basis of the equation (31).

It is possible to set $\theta$ to satisfy the relation $\theta = \pi/2$ by suitably selecting $t_o$ in the equation (300, that is, by suitably selecting the duration of integration. For example, $t_o$ is selected to be 10 ms or 50 ms at $f = 50$ Hz to obtain $\theta = -\pi/2$. Although the value of $t_o$ is limited by the sampling frequency $fs$, the relation $\theta = \pi/2$ can be easily obtained by selecting the sampling frequency $fs$ to be a multiple of $f$, as for example, $fs = 200$ Hz.

In the foregoing description, the present invention has been described with regard to a protective relaying system. Thus, there are only two cases, that is, the case in which an energizing output appears from the system and the case in which any such energizing output does not appear from the system. However, the numerical value which is the output of the fourth means has a certain magnitude as will be apparent from the description given hereinbefore. Therefore, when the fifth means is arranged to display the output of the fourth means, the present invention can be utilized to provide a system which measures physical quantities of an electric power system and such can be easily done without any especial difficulty.

Figure 13:
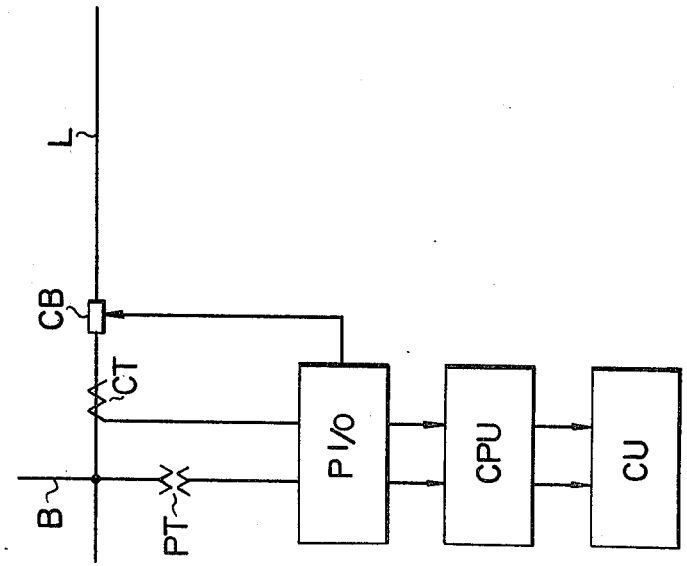
FIG. 13 is a block diagram showing a basic arrangement of hardware employed in a practical form of the present invention.

In the foregoing description, the present invention has been described with reference to the arrangement of software for data processing by an electronic computer. An arrangement of hardware for the practical use of the present invention according to the above-mentioned software will be briefly described with reference to FIG. 13. In FIG. 13, symbols B, CB and L designate a power station bus bar, a circuit breaker, and a transmission line respectively. This transmission line L is protected by a relay, for example, a mho relay having an operating characteristic as shown in FIG. 6. It will be apparent from the previous description that the physical quantities of the electric power system, that is, the voltage and current of the transmission line L must be detected to protect the transmission line L by the mho relay. A power transformer PT and a current transformer CT are provided to derive the voltage and current respectively. A process input-output unit P I/O includes an analog-digital converter in the illustrated form and acts to convert the physical quantities of the electric power system derived by the transformers PT and CT into digital signals which are convenient for processing by a decision and timing control unit CPU. The process input-output unit P I/O acts also to produce a predetermined tripping signal when the unit CPU decides that the circuit breaker CB be tripped and delivers a tripping instruction output.

The decision and timing control unit CPU includes various elements such as logic elements, comparing elements, memory elements, arithmetic elements and timing control elements. This unit CPU is constructed so that a data processing signal, a data storing signal and other necessary signals can be suitably applied together with a predetermined timing signal to the individual elements to be processed according to a predetermined routine on the basis of previously stored contents of the memory elements. A console unit CU similar to that commonly used with an electronic computer is provided so that the process of decision by the unit CPU can be typed out and the software can be partially modified from the exterior.

According to the present invention, therefore, any desired relay characteristics can be obtained by previously storing suitable programs in the memory elements. Further, in the case of protection of one transmission line provided with a circuit breaker, the necessity for tripping may be checked on various kinds of relay characteristics in cascade so that the circuit breaker may not be allowed to trip until the results of check on all the relay characteristics decide that the circuit breaker be tripped. Even in such a case, any especial alteration of the wiring and arrangement of the hardware in FIG. 13 is unnecessary. This means that alterations in the arrangement of the electric power system in the power station can be very simply dealt with and the most suitable protection of the software can be expected always.

While the present invention has been described with reference to data processing by a digital computer, it is obvious that digital circuits may be used to constitute the individual means.

Thus, the present invention provides a novel and flexible protective relaying system in which various types of relay means can be obtained by a digital processing technique applicable in common to all these relay means, and the relay type can be changed by suitably changing the software.

Therefore, the present invention attains the following improvements in the performance and efficiency among others:

(1) By virtue of fault detection by means of digital processing, there is substantially no possibility of inclusion of errors, and the precision of fault detection can be remarkably improved.

(2) Data obtained in the normal and abnormal states of an electric power system can be automatically recorded while being processed in parallel. THis is very convenient for the analysis of fault.

(3) Utilization of a general-purpose computer can simplify the hardware.

Therefore, a great cost reduction can be achieved in the design, manufacture and inspection processes in the maker, and a great cost reduction can also be achieved in the running cost, maintenance cost and standardization of operator education. Thus, a far-reaching economical effect can be expected.

We claim:

1. A method of protecting an electric power system comprising the steps of:
    performing a sampling measurement of at least one electrical AC quantity relating to the operation of the electric power system at a predetermined time cycle different from the cycle of the AC quantity,
    calculating either the square of a value relating to the measurement sampled at each time cycle if only one AC quantity was measured or the product of plural values relating to the measurements sampled at each time cycle if more than one AC quantity was measured.
    extracting from the calculated square or product a component of a desired frequency,
    comparing the extracted component with a predetermined reference value, and
    producing an output to be used for protection of the electric power system according to the result of the comparison.

2. A method of claim 1, further comprising a step, prior to the calculating step, of
    modifying the sampled measurements by applying thereto a pre-process operation according to a preselected mode of intended protection of the electric power system, thereby to produce the values to be used in the calculating step.

3. A method of claim 2, wherein the sampled measurement includes values of a current and of a voltage, both relating to the operation of the electric power system, and wherein the pre-process step operates on the values of current and voltage to produce, as one of the values to be used in the calculating step, a product of a reactance of the electric power system at a steady state and the current, and operates on the values of current and voltage to produce as another of the values to be used in the calculating step, a difference between the voltage and the product of the reactance and the current.

4. A method of claim 2, wherein the sampled measurement includes values of a current and a voltage, both relating to the operation of the electric power system, and wherein the pre-process step operates on the values of current and voltage to produce, as one of the values to be used in the calculating step, a difference between the voltage and a product of an impedance of the power system at a steady state and the current, and operates on the values of current and voltage to produce, as another of the values to be used in the calculating step, an output corresponding to the voltage.

5. A method of claim 2, wherein the sampled measurement includes values of currents flowing through at least two predetermined positions in the electric power system and wherein the pre-process step operates on the values of currents to produce outputs to be used in the calculating step, corresponding to either a summation of instantaneous values of the currents or the respective values of the currents depending on the preselected mode of intended protection of the electrical power system.

6. A method of claim 2, wherein the pre-process step operates on the values relating to the measurement samples to produce two outputs, one output to be used in the calculating step being the sampled measurement itself and the other output to be used in the calculating step being the sampled measurement delayed by a predetermined time.

7. An apparatus for protecting an electric power system comprising:
means for performing a sampling measurement of at least one electrical AC quantity relating to the operation of the electric power system at a predetermined time cycle different from the cycle of said Ac quantity,
means for calculating either the square of a value relating to the measurement sampled at each time cycle if only one AC quantity was measured or the product of plural values relating to the measurements sampled at each time cycle if more than one AC quantity was measured.
means for extracting from the calculated square or product a component of a desired frequency,
means for comparing the extracted component with a predetermined reference value, and
means for producing an output to be used for protection of the electric power system according to the result of said comparison.

8. The apparatus of claim 7, further comprising a means responsive to the sampled measurement for modifying the sampled measurements, said modifying means including pre-process means for pre-processing the sampled measurements according to a preselected mode of intended protection of the electric power system, thereby to produce the values for application to the calculating means.

9. The apparatus of claim 8, wherein said sampled measurement includes values of a current and of a voltage, both relating to the operation of the electric power system, and wherein said pre-process means operates on the values of current and voltage to produce, as one of the values to be used by the calculating means, a product of a reactance of the electric power system at a steady state and the current, and operates on the values of current and voltage to produce, as another of the values to be used by the calculating means, a difference between the voltage and the product of the reactance and the current.

10. The apparatus of claim 8, wherein said sampled measurement includes values of a current and a voltage, both relating to the operation of the electric power system, and wherein said pre-process means operates on the values of current and voltage to produce, as one of the values to be used by the calculating means, a difference between the voltage and a product of an impedance of the power system at a steady state and the current, and operates on the values of current and voltage to produce, as another of the values to be used by the calculating means, an output corresponding to the voltage.

11. The apparatus of claim 8, wherein said sampled measurement includes values of currents flowing through at least two predetermined positions in the electric power system and wherein said pre-process means operates on the values of currents to produce outputs to be used by the calculating means, corresponding to either a summation of instantaneous values of the currents or the respective values of the currents depending on the preselected mode of intended protection of the electrical power system.

12. The apparatus of claim 8, wherein said pre-process means operates on the values relating to the measurement samples to produce two outputs, one output to be used by the calculating means being the sampled measurement itself and the other output to be used by the calculating means being the sampled measurement delayed by a predetermined time.

* * * * *